March 1, 1938. G. A. F. WINCKLER 2,109,813
AUTOMATICALLY LIGHTED LIFESAVING RING BUOY
Filed Oct. 29, 1934   3 Sheets-Sheet 2
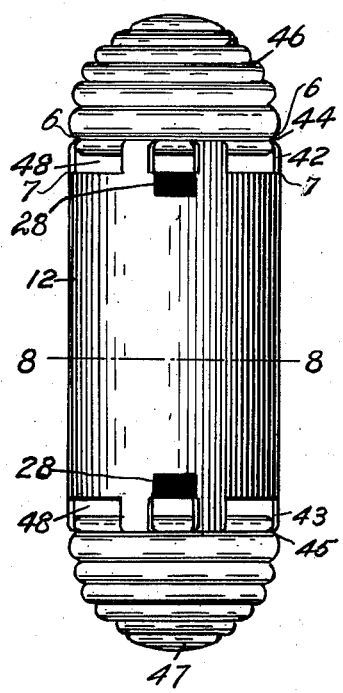
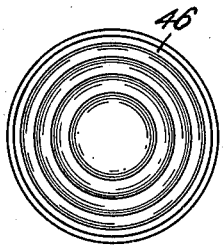
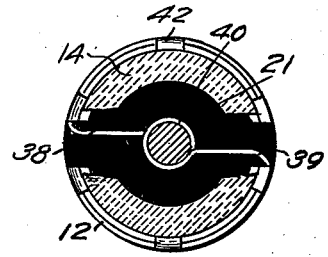
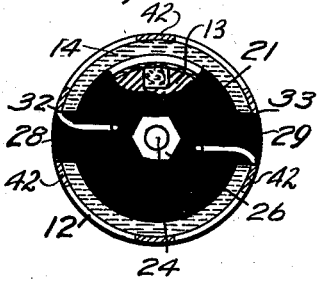
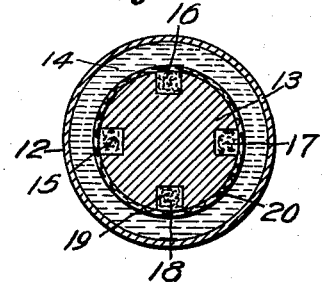
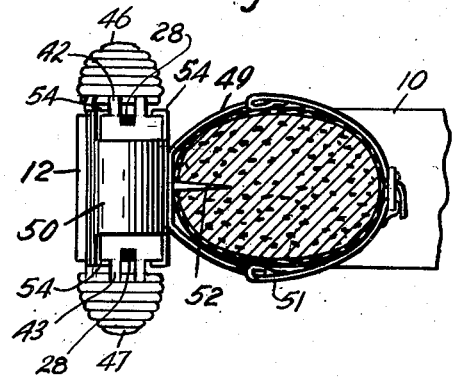
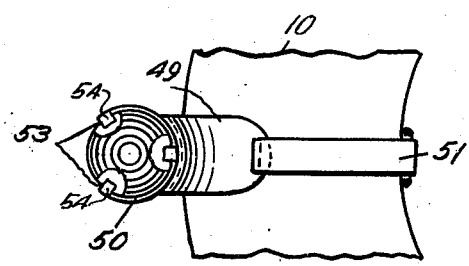
Inventor,
Gunnar A. F. Winckler,
by Frank G. Hattie
Attorney.

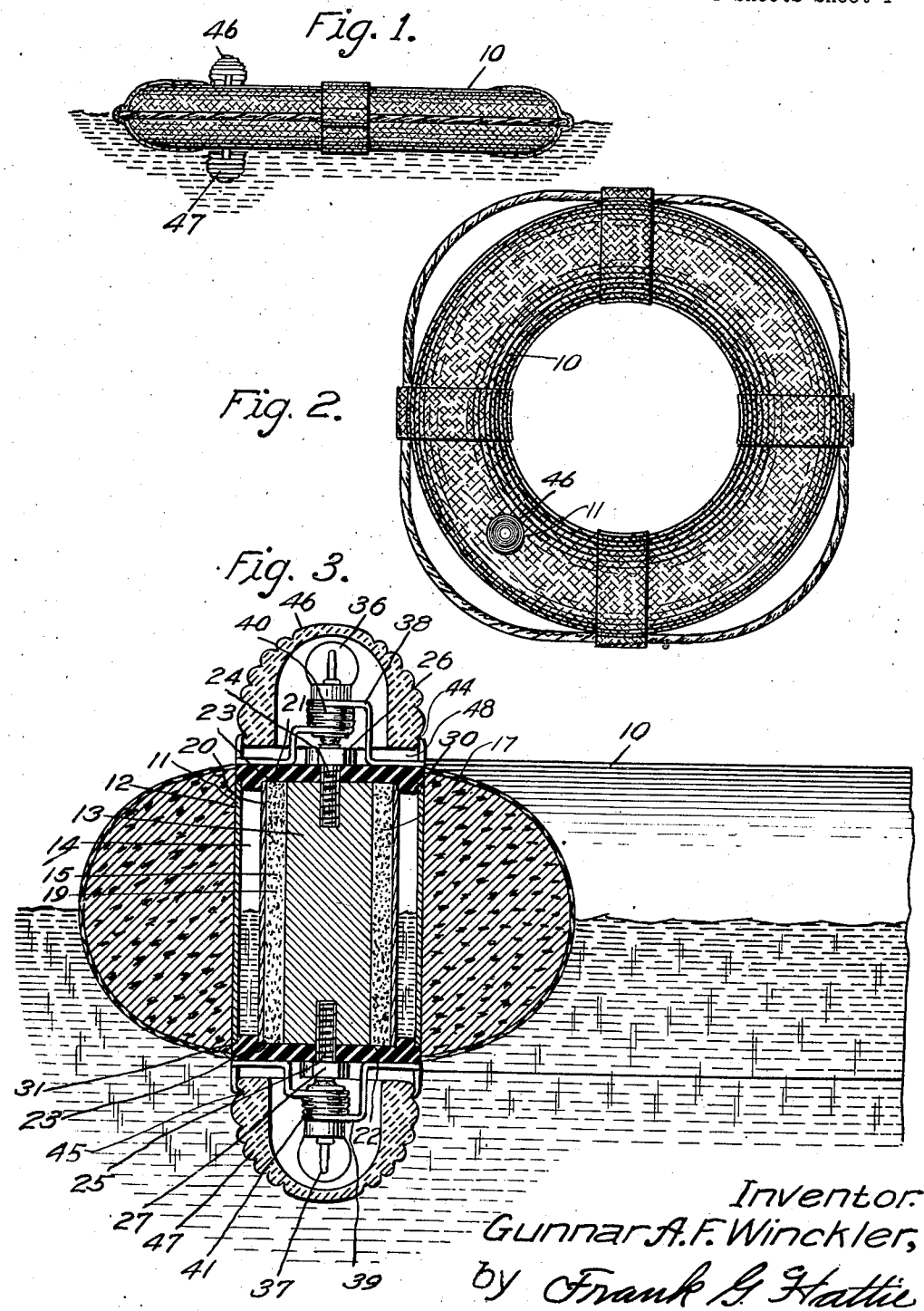

March 1, 1938.　　　G. A. F. WINCKLER　　　2,109,813
AUTOMATICALLY LIGHTED LIFESAVING RING BUOY
Filed Oct. 29, 1934　　　3 Sheets-Sheet 3
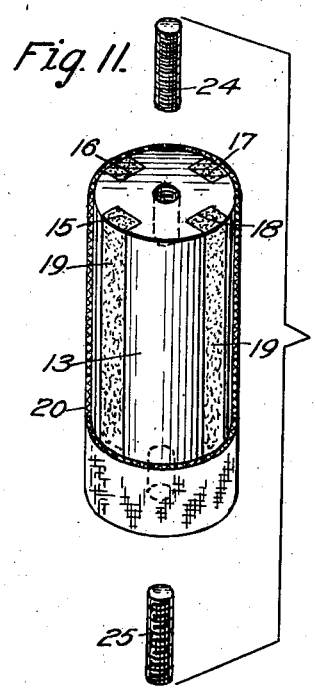
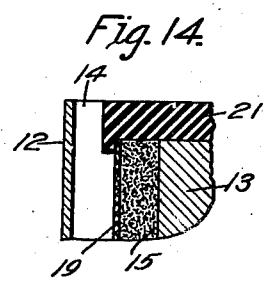
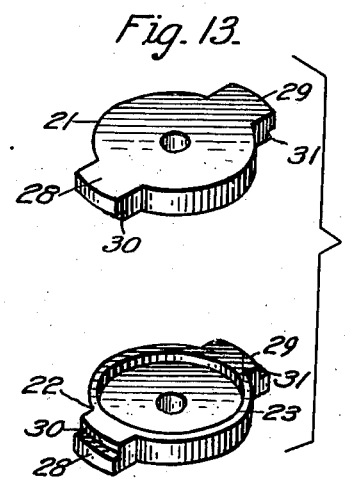
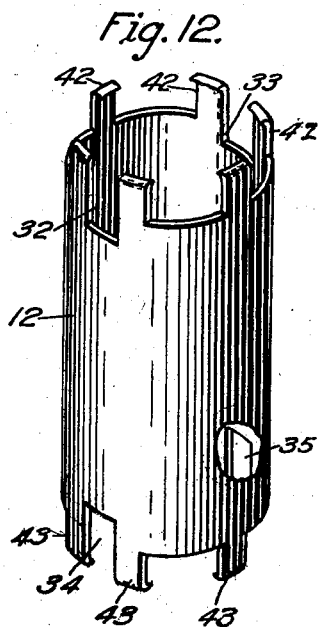
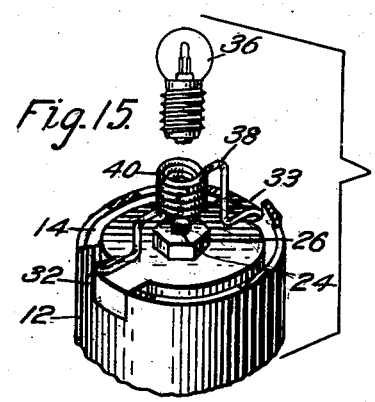
Inventor,
Gunnar A. F. Winckler,
by Frank G. Hattie
Attorney.

Patented Mar. 1, 1938

2,109,813

UNITED STATES PATENT OFFICE 2,109,813

AUTOMATICALLY LIGHTED LIFESAVING RING BUOY

Gunnar A. F. Winckler, Worcester, Mass., assignor to Winckler Engineering Laboratories Incorporated, Boston, Mass., a corporation of Massachusetts Application October 29, 1934, Serial No. 750,524

4 Claims. (Cl. 9—8.3)

The invention relates to an automatic electrically lighted life-saving ring buoy which when immersed in the waters of the salt seas produces light, of which the following is a specification.

The invention consists of securing an electric generator and a signalling system such as a lighting system to any type of ring buoy, and the novelty resides in providing two signalling means such as lamps connected to the lighting system which will extend beyond both the top and bottom sides of the buoy, in such manner that the lighting system will permit both lamps to be lighted, one on each side of the buoy, so that one of these lamps will be seen no matter which side of the buoy is immersed in the waters of the seas.

The invention further consists of novel details of construction of the generating unit and supporting members which will permit the generator to be used universally on this type of marine life-saving device. The novelty of the device lends itself to complete service and dependability, for this type of generator and lighting system and derives its particular utility in that the construction gives infinite shelf life and maximum power when put into operation.

The object of the invention is to provide a generating lighting system for life buoys which will permit two lamps on opposite sides of the buoy and which lamps automatically light when the life buoy is immersed in the waters of the salt seas. This structure will not detract from the utility of the buoy but will be a tremendous advantage as signalling device to fix the position of a person or persons in the waters of the seas.

Referring to the figures it will be seen that:

Fig. 1 is a side elevation of the life buoy floating in the water with the lamps in position;

Fig. 2 is a plan view of the buoy, removed from the water;

Fig. 3 is a vertical cross-section through a part of the buoy and the generator;

Fig. 4 is a front elevation of the generating unit;

Fig. 5 is a plan view of the same;

Fig. 6 is a horizontal cross-section through the lens, showing the electrical connections and lamp sockets;

Fig. 7 is a horizontal cross-section through the casing, showing one of the supporting heads;

Fig. 8 is a horizontal cross-section through the electrodes of the generator;

Fig. 9 is a view, partly in section and partly in elevation, of a modified construction for supporting the generator;

Fig. 10 is a plan view of the same;

Fig. 11 is an isometric exploded view of the negative electrode and depending members;

Fig. 12 is an isometric view of the generator casing and positive electrode;

Fig. 13 is an isometric composite view of the generator heads;

Fig. 14 is a fragmentary view of the generator, showing how the electrolyte enters and leaves the generator; and Fig. 15 is an isometric view of the top of the generator, showing the electric connections and lamp socket and their relation to the generator.

The main embodiment of the invention consists of a ring buoy 10 having signalling means 36 and 37 indicated as lamps which come into action automatically and invariably and only when the buoy is dropped into the sea, regardless of the length of time that the buoy has been stored, and which requires no attention whatsoever during storage, either as to position or condition, the said buoy having at least one casing secured thereto and extending approximately to the depth of the buoy, the said casing having openings at both ends for the influx of water when the buoy is cast into the sea in accordance with the side which is topmost, and also serving as a negative electrode of a voltaic cell. A positive electrode for said cell is disposed within the said casing in spaced relation thereto, the cell buoy being characterized by absolute freedom from electrolyte during storage, thus ensuring infinite shelf-life and infallible ability to come into operation when the buoy is thrown into the sea. A plurality of signalling means 36 and 37 are provided, one mounted on each end of said casing, and circuits permanently connect said signalling means with said cell, so that when the buoy is cast into the sea, the casing will be filled with sea water serving as an electrolyte for the cell. The cell thus will become energized and both signalling means will be brought into operation, that one which is topmost being sensible to the observer.

Referring more specifically to the drawings, which illustrate the new automatically lighted life-saving ring buoy 10, this buoy is shown as made of material such as cork and covered with cloth in the usual manner.

Formed in the buoy 10 is a hole 11 which extends through the buoy and when the said buoy is dropped into the sea, the water rises in the hole 11 to the supporting water level of the sea to carry out the working function of the invention.

Located in the hole 11 is an electrical generating unit 12 held in position by a close fit. One obvious way of ensuring this close fit is to machine the hole 11 under size, so that when the generating unit is forced into position with a lamp visible on either side, the grip of the cork against the generator casing is sufficient to hold it rigidly in position.

The generator is provided with an outer casing 12 made of zinc which serves as a positive electrode of the generator. The casing 12 is provided with a sufficient number of supporting devices to hold the various members in position to make a complete self-contained unit.

Concentric with the casing 12 is a negative electrode 13, the poles of which are reversed and connected to the electrical circuit. A free space 14 is provided between the electrodes 12 and 13 which permits the generator to come into action automatically and invariably and only when the buoy is dropped into the sea, regardless of the length of time that the buoy has been stored, so that the generator requires no further attention whatsoever during storage, the cell being characterized by absolute freedom from electrolyte during storage, thus ensuring infinite shelf-life and infallible ability to come into operation when the buoy is thrown into the sea.

The negative electrode 13 is constructed to obtain the highest efficiency possible for a unit of given size. It is preferably of cylindrical shape. Formed diametrically opposite each other are the vertical rectangular slots 15, 16, 17, and 18 (Fig. 11). The slots are filled with ground carbon 19 or depolarizing mixture to increase the polarization area of the negative electrode and in turn, to increase the efficiency of the generator.

The ground carbon is held in position by a cloth sleeve 20 formed over the negative electrode member to prevent the ground carbon from being moved away and to permit the electrolytic fluid to pass in and around the ground carbon to cover it to increase the polarization area.

The negative electrode 13 is shown as supported in a concentric position in the casing 12 by a novel construction consisting of head members 21 and 22 (Fig. 3) made of insulating material. As these heads are identical in construction, a description of one will be sufficient. Formed in the heads 21 and 22 are inwardly extending annular projections 23 (Figs. 3 and 13) adapted to receive the negative electrode including the cloth cover 20 for holding the ground carbon in the vertical slots 15, 16, 17, and 18 formed in the negative electrode 13.

Formed in the supporting heads 21 and 22 are the holes through which the screws 24 and 25 extend, these latter being threaded into the negative electrode 13. The heads 21 and 22 are placed over the ends of the electrode 13 and are centered by the screws 24 and 25 so that the nuts 26 and 27 (Figs. 3 and 15) can be threaded on the screws 24 and 25 for holding the negative electrode rigidly in position in relation to the heads.

Formed integral with the heads 21 and 22 are outwardly extending projections 28 and 29 (Figs. 4, 7, 9, and 13) having registering shoulders 30 and 31 (Figs. 3 and 13) completing the structure for supporting the negative electrode with precision in the positive electrode 12.

In assembling the structure the projections 28 and 29, having the shoulders 30 and 31, fit closely into the slots 32, 33, 34 and 35 (Figs. 7, 12, and 15) formed in the positive electrode and casing 12, thereby forming a rigid and durable cell structure for the purpose specified.

The screws 24 and 25 are shown as extending above the nuts 26 and 27 sufficiently to serve as contacts for the lamps 36 and 37 (Figs. 3 and 15).

Lamp supports and current conductors 38 and 39 are shown in Figs. 3 and 15 as rigidly secured to the edges of the positive electrode 12 at both ends of the latter. These members 38 and 39 preferably are made of wire having a plurality of helical convolutions forming the lamp sockets 40 and 41 for the lamps 36 and 37. The electrolyte can surround the sockets without short circuiting the lamps, due to the fact that the resistance of the electrolyte is relatively higher than the resistance of the lamp, and having less conductivity, the water will not short circuit the lamp circuit.

At both ends of the casing 12 I show, preferably formed integrally thereon, outwardly extending clip projections 42 and 43 which in the preferred embodiment are peened over into the grooves 44 and 45 (Figs. 3 and 4) of the lenses 46 and 47, thereby serving as supporting devices for the said lenses and leaving a space 48 between the casing 12 and lenses 46 and 47 to allow the electrolyte to enter in its path through the free space 14 to the electrodes of the generator.

Figs. 9 and 10 show the same cell construction adapted to a modified support for securing the cell to the buoy. The illustrations show a generating unit support which can be applied to any form of ring buoy and which, as shown, consists of two frames 49 and 50 made of spring material. The frame 49 is more or less flexible in its nature and extends over the ring buoy 10 and is shown as held in position by the strap 51 by means of a buckle. Secured to each member 49 and 50 is a sharp prong 52 which is forced into the cork ring for locating and holding the structure in position. The frame 50 preferably is cylindrical in shape and is made of spring material having an opening 53 which allows the generating unit to be forced into position. The opening 53 is of sufficient width to permit the generating unit to be forced against the edge, thereby opening the space sufficiently to allow the unit to enter, whereupon the frame 50 will then close over the generating unit and will hold it securely in position. This frame 50 is provided with bent over holding fingers 54, which extend over both edges of the positive electrode 12, which latter is held in the grip of the spring frame 50, the fingers 54 preventing vertical movement, so that the generating unit is held securely in position to be used under varying emergency conditions if needed.

It is obvious that once the broad features are disclosed, many modifications and adaptations will readily occur to those skilled in the art, all falling within the ambit of my invention. Accordingly, I intend that my invention be limited only by the scope of the appended claims.

What I claim as new and desire to secure by Letters Patent in the United States is:

1. A ring buoy having signalling means which come into action automatically and invariably and only when the buoy is dropped into the sea, regardless of the length of time that the buoy has been stored, and which requires no attention whatsoever during storage; either as to position or condition, the said buoy having a hole therethrough, a casing in said hole, the said casing having openings therein for the influx of water when the buoy is cast into the sea and serving as the negative electrode of a voltaic cell, a positive electrode for said cell disposed within said casing in spaced relation thereto, the cell being characterized by absolute freedom from electrolyte during storage, thus ensuring infinite shelf-life and infallible ability to come into operation when the buoy is thrown into the sea, a plurality of lamps mounted one on each end of the cell, circuits permanently connecting said lamps with said cell, so that when the buoy is cast into the sea, the casing will be filled with water serving as an electrolyte, the cell will become energized, and both lamps will be illuminated, that one which is topmost being visible to an observer, lugs formed on both ends of the casing, and lenses supported by said lugs and disposed around said lamps.

2. A ring buoy having signalling means which come into action automatically and invariably and only when the buoy is dropped into the sea, regardless of the length of time that the buoy has been stored, and which requires no attention whatsoever during storage, either as to position or condition, the said buoy having a hole therethrough, a casing in said hole, the said casing having openings therein for the influx of water when the buoy is cast into the sea and serving as the negative electrode of a voltaic cell, a positive electrode for said cell disposed within said casing in spaced relation thereto, the cell being characterized by absolute freedom from electrolyte during storage, thus ensuring infinite shelf-life and infallible ability to come into operation when the buoy is thrown into the sea, a plurality of lamps mounted one on each end of the cell, circuits permanently connecting said lamps with said cell, so that when the buoy is cast into the sea, the casing will be filled with water serving as an electrolyte, the cell will become energized, and both lamps will be illuminated, that one which is topmost being visible to an observer, lugs formed on both ends of the casing, lenses supported by said lugs and disposed around said lamps, supporting bars of insulating material for tying the positive and negative electrodes together and only partially covering the ends of the cell, inwardly extending projections formed integral with the supporting bars and providing a free space between the electrodes to allow the saline solution to immerse and energize the cell and to electrically disconnect the electrodes when the cell is removed from the saline solution.

3. A ring buoy having signalling means which come into action automatically and invariably and only when the buoy is dropped into the sea, regardless of the length of time that the buoy has been stored, and which requires no attention whatsoever during storage, either as to position or condition, a casing, the said casing having openings therein for the influx of water when the buoy is cast into the sea and serving as the negative electrode of a voltaic cell, a positive electrode for said cell disposed within said casing in spaced relation thereto, the cell being characterized by absolute freedom from electrolyte during storage, thus ensuring infinite shelf-life and infallible ability to come into operation when the buoy is thrown into the sea, a plurality of lamps mounted one on each end of the cell, circuits permanently connecting said lamps with said cell, so that when the buoy is cast into the sea, the casing will be filled with water serving as an electrolyte, the cell will become energized, and both lamps will be illuminated, that one which is topmost being visible to an observer, lugs formed on both ends of the casing, lenses supported by said lugs and disposed around said lamps, supporting bars of insulating material for tying the positive and negative electrodes together and only partially covering the ends of the cell, inwardly extending projections formed integral with the supporting bars and providing a free space between the electrodes to allow the saline solution to immerse and energize the cell and to electrically disconnect the electrodes when the cell is removed from the solution, and means for securing the cell to the edges of the ring buoy.

4. A ring buoy having signalling means which come into action automatically and invariably and only when the buoy is dropped into the sea, regardless of the length of time that the buoy has been stored, and which requires no attention whatsoever during storage, either as to position or condition, a casing having openings therein for the influx of water when the buoy is cast into the sea and serving as the negative electrode of a voltaic cell, a positive electrode for said cell disposed within said casing in spaced relation thereto, the cell being characterized by absolute freedom from electrolyte during storage, thus ensuring infinite shelf-life and infallible ability to come into operation when the buoy is thrown into the sea, a plurality of lamps mounted one on each end of the cell, circuits permanently connecting said lamps with said cell, so that when the buoy is cast into the sea, the casing will be filled with water serving as an electrolyte, the cell will become energized, and both lamps will be illuminated, that one which is topmost being visible to an observer, lugs formed on both ends of the casing; and lenses supported by said lugs and disposed around said lamps, a spring clamp secured to the casing, a tie clamp secured to the spring clamp, a prong integral with the spring clamp to pierce the buoy for holding the structure in position, and a spring means for securing the casing to the clamp.

GUNNAR A. F. WINCKLER.